United States Patent
Himayat et al.

(10) Patent No.: US 9,872,197 B2
(45) Date of Patent: Jan. 16, 2018

(54) NETWORK SELECTION IN A HETEROGENEOUS NETWORK

(71) Applicant: INTEL IP CORPORATION, Santa Clara, CA (US)

(72) Inventors: Nageen Himayat, Fremont, CA (US); Shu-Ping Yeh, New Taipei (TW); Mikhail Gerasimenko, Tampere (FI); Sergey Andreev, Tampere (FI); Shilpa Talwar, Los Altos, CA (US); Alexander Sirotkin, Petach Tikva (IL); Mo-Han Fong, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 113 days.

(21) Appl. No.: 14/786,145

(22) PCT Filed: Mar. 28, 2014

(86) PCT No.: PCT/US2014/032233
§ 371 (c)(1),
(2) Date: Oct. 21, 2015

(87) PCT Pub. No.: WO2014/186062
PCT Pub. Date: Nov. 20, 2014

(65) Prior Publication Data
US 2016/0073287 A1    Mar. 10, 2016

Related U.S. Application Data

(60) Provisional application No. 61/824,337, filed on May 16, 2013.

(51) Int. Cl.
*H04L 1/00* (2006.01)
*H04W 28/02* (2009.01)
(Continued)

(52) U.S. Cl.
CPC ....... *H04W 28/0236* (2013.01); *H04W 24/02* (2013.01); *H04W 48/18* (2013.01);
(Continued)

(58) Field of Classification Search
CPC . H04W 28/0236; H04W 24/02; H04W 88/06; H04W 24/08; H04W 84/042; H04W 84/12
(Continued)

(56) References Cited

U.S. PATENT DOCUMENTS

2006/0092891 A1    5/2006  Goldberg et al.
2008/0013556 A1*   1/2008  Kaippallimalil ...... H04W 8/065
                                                        370/401
(Continued)

FOREIGN PATENT DOCUMENTS

WO       2005055502 A2      6/2005

OTHER PUBLICATIONS

Aryafar, et al; RAT Selection Games in HetNets; 2013 Proceedings IEEE Infocom.
(Continued)

*Primary Examiner* — Faisal Choudhury
(74) *Attorney, Agent, or Firm* — Thorpe North & Western

(57) ABSTRACT

Technology for a user equipment (UE) to communicate in a multiple radio access technology (multi-RAT) heterogeneous network (HetNet) is described. A radio-link-selection hysteresis threshold can be determined at the UE for a radio link between the UE and a node in the multi-RAT HetNet. A reliability value of a throughput estimate can be measured for the radio link in the multi-RAT HetNet. The radio-link-selection hysteresis threshold can be adjusted at the UE based on the reliability value to increase network stability in the multi-RAT HetNet.

25 Claims, 10 Drawing Sheets

(51) Int. Cl.
*H04W 48/18* (2009.01)
*H04W 24/02* (2009.01)
*H04W 88/06* (2009.01)
*H04W 24/06* (2009.01)
*H04W 24/08* (2009.01)
*H04W 84/04* (2009.01)
*H04W 84/12* (2009.01)

(52) U.S. Cl.
CPC ............ *H04W 24/06* (2013.01); *H04W 24/08* (2013.01); *H04W 84/042* (2013.01); *H04W 84/12* (2013.01); *H04W 88/06* (2013.01)

(58) Field of Classification Search
USPC .......................................................... 370/236
See application file for complete search history.

(56) References Cited

U.S. PATENT DOCUMENTS

| 2010/0142498 | A1 | 6/2010 | Hyounhee | |
| 2011/0013539 | A1* | 1/2011 | Ayyagari | H04L 12/66 370/254 |
| 2011/0117954 | A1 | 5/2011 | Iwamura et al. | |
| 2014/0126410 | A1* | 5/2014 | Agarwal | H04W 24/02 370/252 |
| 2014/0211681 | A1* | 7/2014 | Chan | H04N 21/6405 370/312 |

OTHER PUBLICATIONS

3GPP TR 37.834 V0.2.0—Study on WLAN/3GPP Radio Interworking (Release 12)(Apr. 2013); France.

3GPP TSG RAN2 Meeting #81bis; R2-131348; WLAN/3GPP access network selection based on maximum achievable rate metric; Chicago USA; Apr. 15-19, 2013.

International Search Report for PCT/US2014/032233 dated Jul. 30, 2014.

Himayat, et al; Design and Performance Analysis of Multi-Radio Small Cell Networks; undated.

* cited by examiner

NETWORK SELECTION IN A HETEROGENEOUS NETWORK

RELATED APPLICATIONS

This application claims the benefit of and hereby incorporates by reference U.S. Provisional Patent Application Ser. No. 61/824,337, filed May 16, 2013.

BACKGROUND

Increased use of mobile devices, such as smartphones and tablets, with an expanding number of wireless services offered on the devices, such as streaming video, have placed increased data loads and throughput requirements on wireless networks. To handle the increasing amount of wireless services to an increasing numbers of users, various multiple antenna techniques can be employed in wireless network environments to meet the increasing data and throughput demands.

In homogeneous networks, transmission stations, also called macro nodes, can provide basic wireless coverage to mobile devices. The geographical coverage area for each node can be referred to as a cell. The geographical coverage area of a macro node can be referred to as a macro cell. Heterogeneous networks (HetNets) were introduced to handle increased traffic loads on the macro nodes due to increased usage and functionality of mobile devices. HetNets can include a layer of planned high power macro nodes (or macro eNode Bs) overlaid with layers of lower power nodes (micro-nodes, pico-nodes, femto-nodes, home-nodes, relay stations, WLAN APs, integrated 3GPP pico with co-located WLAN APs, etc.) that can be deployed in a less organized or uncoordinated manner within the coverage area of the macro nodes. The macro nodes can be used for basic coverage, and the low power nodes can be used to fill coverage holes, to improve capacity in hot-zones or at the boundaries between the macro nodes' coverage areas, and to improve indoor coverage where building structures impede signal transmission.

However, even with a targeted deployment of lower power nodes, many users still receive a stronger downlink signal or have a greater downlink capacity from the tower-mounted macro node. For a more balanced use of nodes in a HetNet, such as to balance the traffic load for a given node, the use of node association and radio access technology (RAT) selection can be used to reduce the load on selected nodes such as macro-nodes. A reduced load on the nodes can provide users with better service.

Several approaches to node association and RAT selection have emerged for different embodiments of multiple radio access technology (multi-RAT) HetNet architectures to better distribute traffic across the overall network. Current methods for network selection between multi-radio networks (e.g. for WiFi offload between a third generation partnership project (3GPP) network and wireless local area network (WLAN) networks) rely on user equipment (UEs) to make network selection decisions. Mechanisms to guide UE network selection can be based on semi-static policies available from an access network discovery & selection function (ANDSF). Currently, many of the mechanisms to guide UE network selection rely on the UEs to account for local radio link conditions before making network selection decisions.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
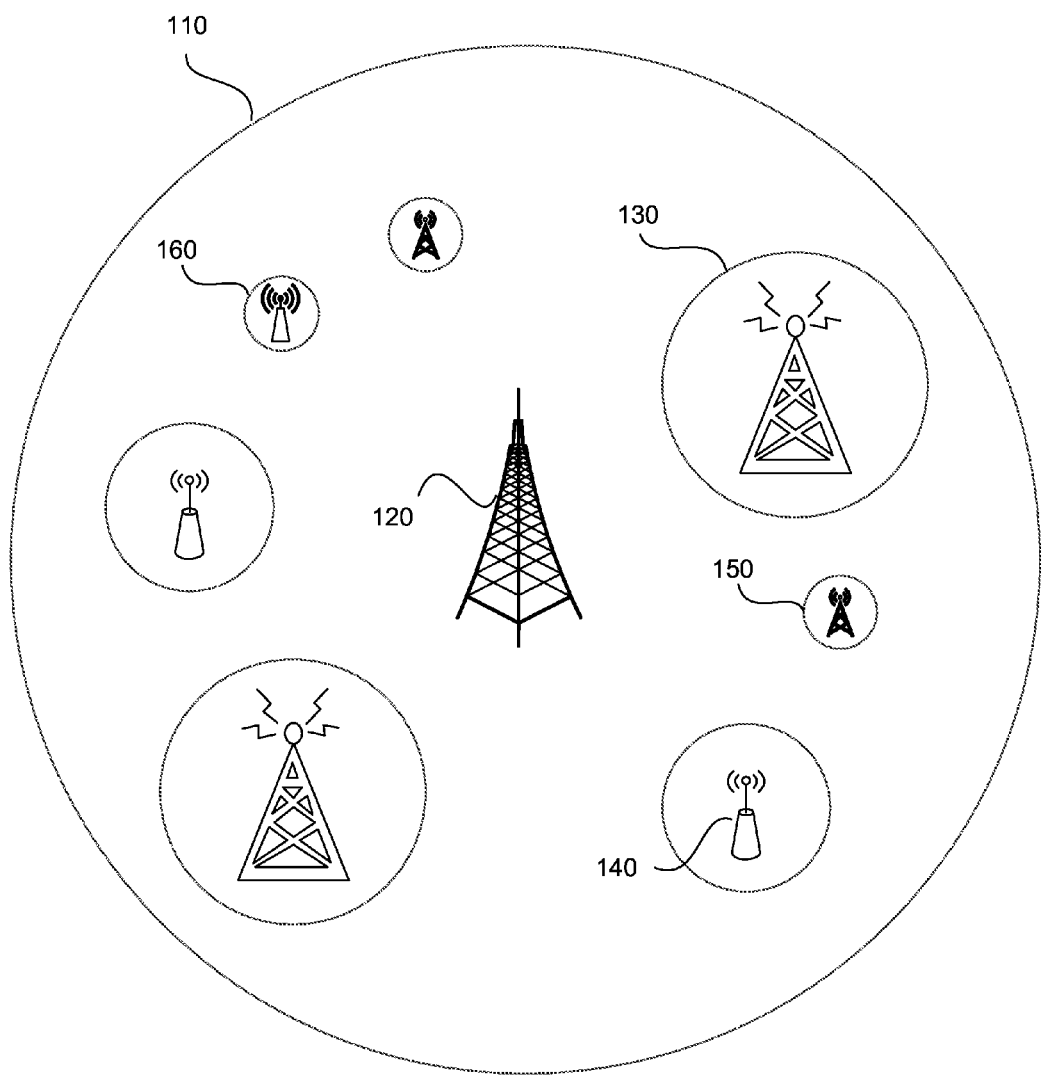
FIG. 1 depicts a multi-RAT HetNet with a macro-cell and a macro-node overlaided with layers of lower power nodes in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

FIG. 1 depicts a multiple radio access technology (multi-RAT) heterogeneous networks (HetNet) with a macro-cell 110 and a macro-node 120 overlaided with layers of lower power nodes including micro-nodes 130, pico-nodes 140, femto-nodes 150. The macro nodes and low power nodes can be configured to operate in a licensed portion of the radio spectrum. In addition, radio access technologies configured to operate in the unlicensed portions of the radio spectrum, such as wireless local area network (WLAN) access points (APs) 160 can also be used. In one embodiment, the WLAN APs can operate based on a standard such as the Institute of Electronics and Electrical Engineers (IEEE) 802.11-2012, IEEE 802.11ac, or IEEE 802.11ad standard. Other wireless standards for wireless networks configured to operate in unlicensed portions of the radio spectrum, such as Bluetooth, can also be used in a multi-RAT HetNet.

Radio links are often shared amongst multiple users, where the network selection by each UE is based only on maximizing the throughput performance of the UE. The self-maximizing network selection of each UE can cause undesirable overall user and system performance. For example, a UE may excessively switch back and forth between different radio networks causing a significant gap between actual performance and optimal achievable performance of the user and the system. Adaptive hysteresis mechanisms can enable stable and effective performance of load aware UE-centric network selection. The hysteresis mechanisms can be adapted to adjust for unreliability in estimating network throughput for network selection to eliminate or minimize instability and convergence failure of a network selection.

Several approaches for distribution of users across access networks have emerged for multi-RAT HetNets to improve distribution of the users and optimize system performance. One approach is a UE-centric RAT selection in multi-RAT Het-Nets. For UE-centric RAT selection, each UE selects RAT(s) or cell(s) independent of any cooperation and/or assistance from the multi-RAT HetNet to maximize the throughput of the UE without assuming any cooperation and assistance from the multi-RAT HetNet. For example, a UE selecting RAT(s) or cell(s) using a UE-centric RAT selection scheme can move from a current cell or RAT that the UE is using when an estimated throughput for the UE on a different RAT would exceed its current throughput. However, a UE-centric RAT selection scheme can provide for sub-optimal performance, e.g. a gap or reduction in performance, for the network and/or UE performance.

Increased cooperation in the network can provide optimal network assistance information to provide cell selection or RAT selection by the UEs that maximizes a system centric metric, such as sum throughput or proportional fair throughput per node or per service area. In one embodiment of a multi-RAT HetNet architecture, the architecture includes integrated multi-RAT small nodes, where a multiple radio interface such as wireless fidelity (WiFi) and third generation partnership project (3GPP) can be integrated as part of a single infrastructure device. In another embodiment, the multi-RAT HetNet architecture can include an increased level of cooperation between nodes and UEs. As used herein, the term "3GPP" can refer to cellular network systems configured to operate using the 3GPP Rel. 8, 9, 10, 11 or 12 specifications.

Figure 2:
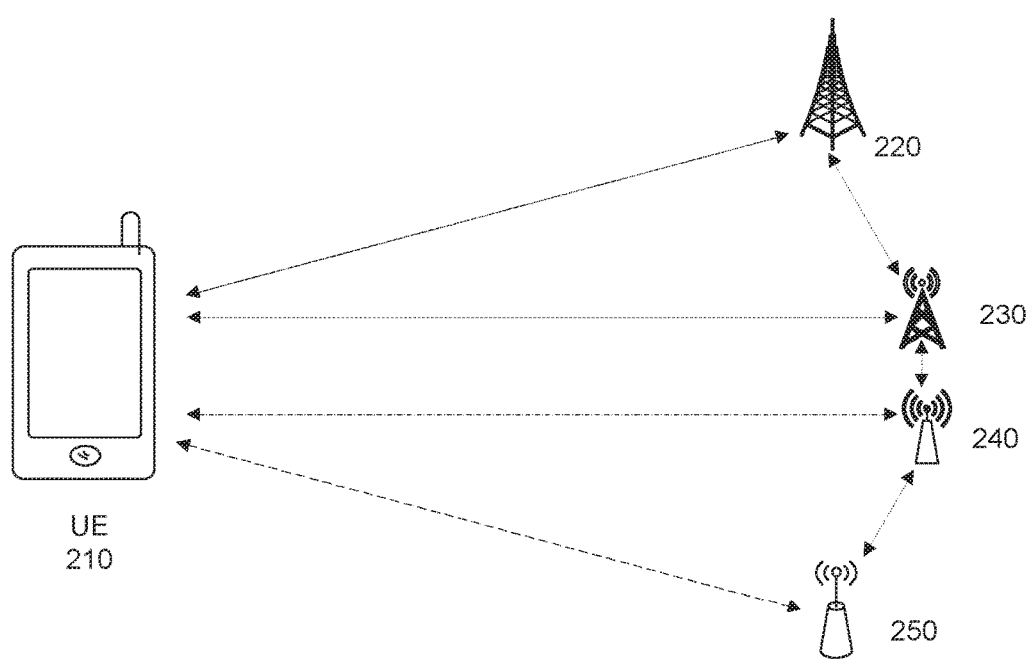
FIG. 2 depicts a cooperative network in accordance with an example.

FIG. 2 illustrates one example of a cooperative network. FIG. 2 shows a UE 210 in communication with multiple nodes, including a macro-node 220, a femto-node 230, WiFi AP 240, and a pico-node 250. In one embodiment, different node types can be in communication with each other, aid in computations, and share information. FIG. 2 further depicts that the macro-node 220, the femto-node 230, WiFi AP 240, and the pico-node 250 are also in communication with each other as well as in communication with the UE 210.

A cooperative node association design can enable optimal results for UE centric network selection schemes. One advantage of a UE network selection centric scheme can be to enable a UE to factor in user preferences in RAT selection. Another advantage of UE network selection centric schemes can be to reduce signaling overhead.

Radio links can be shared between multiple users. Self-optimizing decisions by UEs, based on maximizing the throughput performance of the UE, can cause suboptimal user and system performance. For example, when a UE makes a self-optimizing network selection decision, excessive switching back and forth between different radio networks can occur. Also, when a UE makes a self-optimizing network selection decision, a significant gap can occur between actual achieved performance and optimal achievable performance of the UE and/or the system.

In one embodiment, an adaptive hysteresis mechanism can provide stable and effective performance for load aware UE-centric network selection. The adaptive hysteresis mechanism can be adapted to adjust for the unreliability in estimating network throughput, avoid unstable network selection behavior, and avoid a fail to converge. In one embodiment, an unstable network selection behavior can be a UE switching back and forth between multiple networks. In another embodiment, an unstable network selection behavior can be a UE frequently or repeatedly changing networks over a short or brief period of time.

Figure 3:
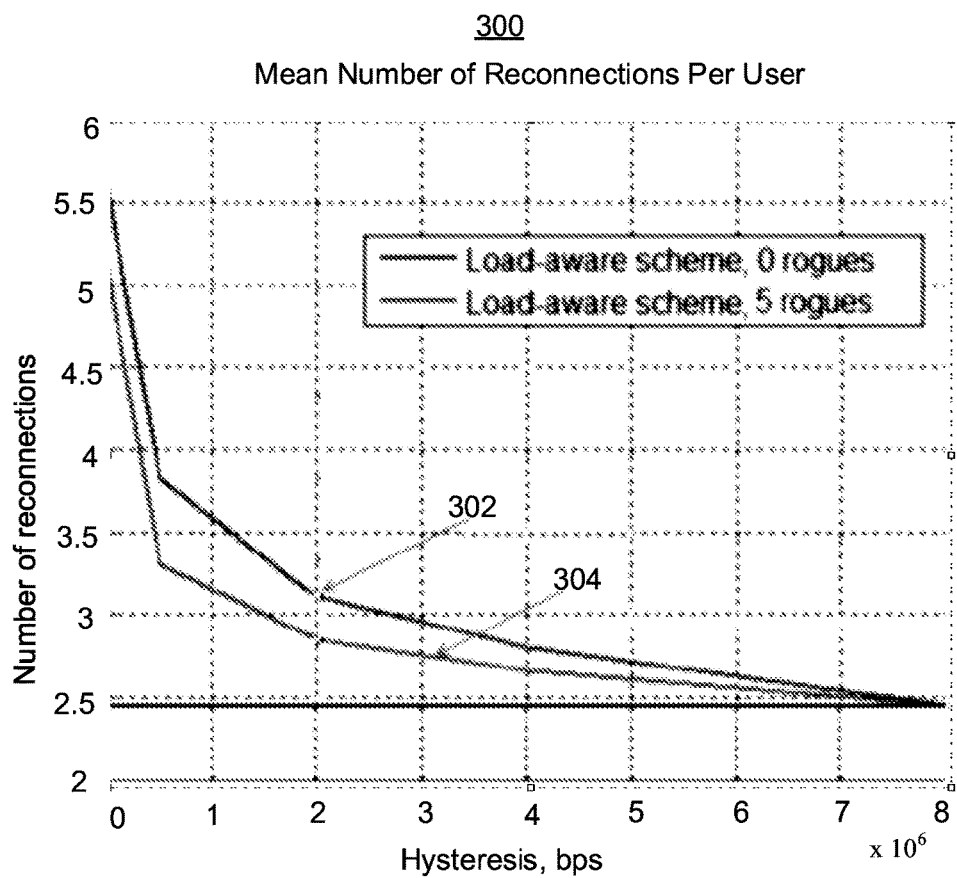
FIG. 3 depicts a switching graph showing a switching behavior of a UE in a load-aware network selection scheme in accordance with an example.

Improved load balancing can be achieved with load aware schemes, where a UE estimates an expected throughput of the UE across one or more radio networks based on knowledge of a load of the one or more radio networks. FIG. 3 depicts a switching graph 300 showing a switching behavior of a UE in a load-aware network selection scheme. FIG. 3 also illustrates the effect of hysteresis on a load aware network selection scheme with interference cause by rogue or uncontrolled WiFi interfering nodes. A rogue WiFi node can be a WiFi node that has been installed in the WiFi network or is within the coverage area of the WiFi network without authorization from the WiFi network and/or that is not in communication with the WiFi network. Rogue or uncontrolled WiFi interfering nodes can degrade the performance of a WiFi network. Line 302 of the switching graph 300 shows a performance of a WiFi network with five rogue nodes for each access point (AP). Line 304 of the switching graph 300 shows a performance of a WiFi network without any rogue nodes. Switching graph 300 shows that the hysteresis can be used to limit or control a UE switching back and forth between different networks in a load aware network selection scheme. In one embodiment, a time hysteresis and/or probabilistic switching can be used to limit or control a UE switching back and forth between different networks in a load aware network selection scheme.

Figure 4:
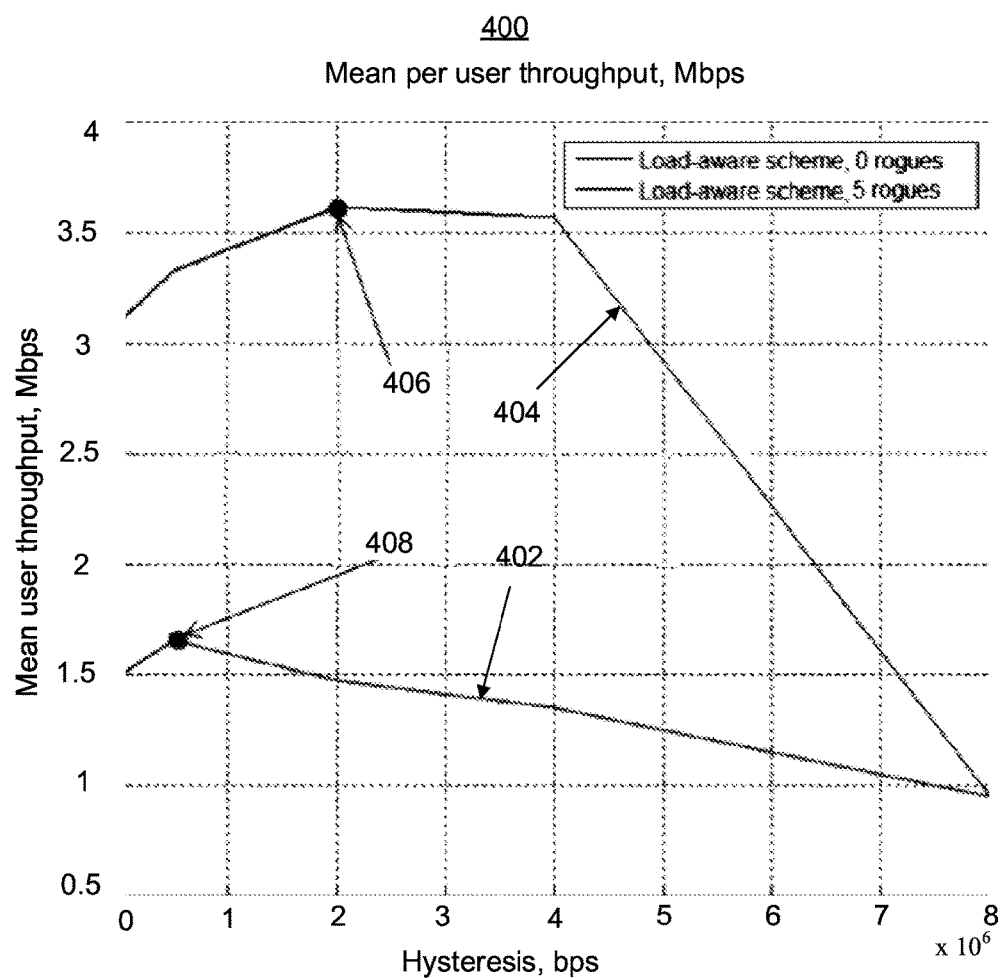
FIG. 4 depicts a throughput graph showing a throughput of a UE in a load-aware network selection scheme for selected hysteresis values in accordance with an example.

Load aware RAT network selection in a multi-RAT Het-Net can be based on a UE estimating a throughput of one or more cells or RATs in a network within a selected radius or distance of the UE and estimating the throughput of one or more cells or RATs of another network. The UE can compare whether a throughput of one or more cells or RATs of another network exceeds, by a selected threshold value, the existing throughput of the one or more cells or RATs that the UE is currently using. FIG. 4 depicts a throughput graph 400 showing a throughput of a UE in a load-aware network selection scheme for selected hysteresis values. Line 402 of the throughput graph 400 shows a performance of a WiFi network with five rogue nodes for each AP. Line 404 of the throughput graph 400 shows a performance of a WiFi network without any rogue nodes. FIG. 4 further shows that an optimal hysteresis value can dynamically change based on the number of rogue nodes for each AP. For example, point 406 on line 404 shows one optimal hysteresis value for five rogue nodes and point 408 shows a different optimal hysteresis value for zero rogue nodes.

In one embodiment, the UE can determine the throughput information for one or more cells or RATs in a network, i.e. neighborhood information, using a UE-based search or using discovery assistance from the network. For example, a UE connected to the network can determine the throughput of one or more cells or RATs in the current network and the throughput of one or more cells or RATs in another network.

The UE can compare the throughput of the current network with the throughput of another network and determine when to switch from the current network to the other network. In one embodiment, the UE can determine when to switch from the current network to another network using the following equation:

$$\text{Throughput}_{i,k}(t) > \alpha \times \text{Throughput}_{i,j}(t) \, k \neq j, \quad (1)$$

where i is a selected UE, j is a current network or first network that the UE is currently in communication with, k is another network or second network, t is a time, and $\alpha$ is a throughput threshold value.

In one embodiment, the selected threshold value $\alpha$ can be determined by the network. In another embodiment, the selected threshold value $\alpha$ is a predetermined value provided by the network to the UE. In one embodiment, the throughput estimate of the current network and/or the other network can be a time averaged throughput estimate. In one embodiment, the selected threshold value $\alpha$ can be dynamically adjusted based on selected parameters. For example, the selected threshold value $\alpha$ can be adjusted based on the density or concentration level of cells or nodes of the area that the UE is being used in. In another embodiment, the throughput of the other network must exceed the throughput threshold value for a select period of time or number of switching periods. In another embodiment, when there is more than one cell or RAT in the other network with a throughput that exceeds the throughput threshold value, the UE can select the cell or RAT with a maximum throughput.

In one embodiment, after a UE switches from the current network or first network to the other network or second network, for the UE to switch back to the first network, a new throughput of the first network must exceed, by a selected value, the throughput of the first network at the time approximate to when the UE switched to the second network. For example the throughput of a 3GPP network may have increased after the UE switched from the 3GPP to a WLAN network. In this example, for the UE to switch back to the 3GPP network, the current throughput of the 3GPP network must exceed the current throughput of the WLAN and the current throughput of the 3GPP network must also exceed the throughput of the 3GPP network at the time approximate to when the UE switched to the WLAN network. The UE can determine when to switch back from the second network to the first network using the following equation:

$$\text{Throughput}_{i,j}(t+N) > \text{Throughput}_{i,j}(t) \quad (2)$$

where N is a throughput threshold value that is in addition to the initial throughput of first network at the time approximate to when the UE switched to the second network, e.g. t+N is the current throughput of the first network. The remaining variables are the same as described for equation 1 in the preceding paragraphs.

Figure 5:
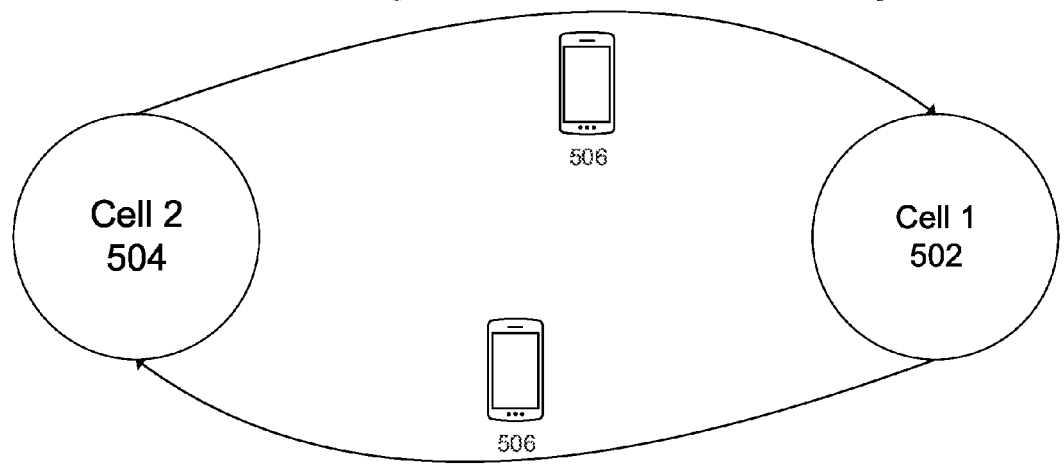
FIG. 5 illustrates a UE switching between a first cell and a second cell in accordance with an example.

FIG. 5 illustrates a UE 506 switching between a first cell, cell 1 (502), and a second cell, cell 2 (504). FIG. 5 shows that the UE 506 is initially in communication with cell 1 (502). The UE 506 can determine, such as by using equation 1, that a throughput of cell 2 (504) exceeds a throughput of cell 1 (502) by a throughput value greater than a threshold value $\alpha$. When UE 506 determines that the throughput of cell 2 (504) exceeds the throughput of cell 1 (502) by a throughput value greater than the threshold value $\alpha$, UE 506 can switch to using cell 2 (504). After a period of time, the UE 506 can determine, such as by using equation 2, that a new throughput of cell 1 (502) exceeds the throughput of cell 2 (506) and the current throughput of cell 1 (504) exceeds the throughput of cell 1 (504) by a selected throughput value at the time approximate to when the UE initially switched from cell 1 (502) to cell 2 (504).

The throughput threshold a can be a control parameter to adjust a convergence and/or optimality performance of a UE based RAT selection algorithm. For example, as the value of a increases, the number of times the UE switches between networks decreases. Additionally, as the value of a increases, a difference or gap decreases between an optimal throughput performance and actual throughput performance of the UE. In one embodiment, when an error rate in throughput estimates is substantially similar to the threshold value $\alpha$, RAT selection using equation 1 and/or equation 2 can become unstable.

The performance of a network can also be optimized by controlling a UE based network selection to reduce correlated and/or simultaneous network switching by a UE. To reduce correlated and/or simultaneous network switching, the network can restrict a UE to switching networks based on a probability of a selected condition occurring, such as a network condition, or a selected parameter. In one embodiment, the selected parameter can be a reliability of a throughput estimate and/or the reliability of a change in a throughput estimate during network selection by the UE. In one embodiment, a hysteresis mechanism used for UE-centric RAT selection can be adapted to estimate the reliability of a throughput estimate.

The hysteresis mechanism can be adapted by using selected reliability metrics to adapt hysteresis parameters of the hysteresis mechanism. In one embodiment, a hysteresis parameter can indicate a dependence of a RAT switching to the history of past switches that a user has made. In one embodiment, the hysteresis mechanism can be used for network selection between WLAN, such as WiFi networks, and 3GPP RATs. The hysteresis mechanism can be adapted to enable stable performance of UE-centric RAT selection. In one embodiment, the adapted hysteresis mechanism can be used to steer traffic across different networks.

In one embodiment, the hysteresis mechanism can be adapted for changing the threshold value. The threshold value can be set to account for unreliability in throughput estimates of one or more networks to enable stable RAT selection. For example, unreliability or variability in throughput estimates, i.e. an estimation error, can cause an unstable RAT selection using the RAT selection equations 1 and/or equation 2.

In one embodiment, a UE throughput estimate can be inaccurate because the UE can only use a selected RAT to transmit data traffic from the UE. In another embodiment, a UE throughput estimate can be inaccurate or have an error factor because the UE may be in an idle state over the 3GPP network, i.e. the UE is not actively transmitting over a selected RAT. When the UE is in an idle state, the UE may not have full knowledge of all the MIMO modes feasible for transmission. When the UE is not using the selected RAT to transmit data traffic or the UE is in an idle state, the UE can rely on auxiliary network assistance information from the network or measurement opportunities to probe and estimate performance or throughput of other networks. In one embodiment, the auxiliary network assistance information can include WiFi network information, such as throughput information or reliability information that is communicated from the WiFi network to a UE via a cellular network. A throughput estimate based on auxiliary network assistance information from other networks or measurement opportunities can be inaccurate or have an error range.

In one embodiment, a throughput estimate for a WLAN can be inaccurate or have an error factor because the throughput estimation relies on load information available from one or more beacons transmitted by WLAN APs, i.e. BSS_Load_Info. The UE can generate throughput estimates by normalizing an achievable rate of the UE with the loading information or the number of users associated with the current AP. The throughput estimate can be inaccurate or off by an error factor because of a local interference environment at the UE. The local interference environment at the UE, such as rogue nodes, can cause a lower estimated throughput rate than the throughput rate estimated based on the information received from the AP.

In another embodiment, a throughput estimate can be inaccurate or have an error factor because in a 3GPP network selects a UE transmission rate and a MIMO mode a UE uses for transmission of data. While a UE can predict a throughput based on a channel quality measured by the UE, MIMO mode preference, and load or resource allocation information from the network, there can mismatches between predicted and actual throughput because of the UE transmission rate and MIMO mode selection performed by the network. In another embodiment, a throughput estimate can be inaccurate or have an error factor because UEs can enter or leave a cell or RAT, which causes loading information available from the network to become outdated and unreliable.

A reliability metric can be determined for a throughput estimate of a selected RAT. In one embodiment, the reliability metric can range from zero to one. During the period of transmitting data, a UE can connect to a selected RAT several times. The UE can generate a reliability estimate for the selected RAT by correlating an actual throughput value measured by the UE during data transmission with a throughput estimate based on load information provided by the network. For example, the reliability factor can be determined using the following equation: $W_R$=Abs(Actual Throughput−Estimated Throughput)/maximum (Actual Throughput, Estimated Throughput), where maximum (Actual Throughput, Estimated Throughput) is a maximum value of the larger of the actual throughput value or the estimate throughput value. In one embodiment, the UE can store past reliability estimates and compute an averaged metric, a median metric, a median plus variance value, or other statistical measurements based on the past reliability estimates.

In another embodiment, for a throughput estimate in a WLAN Network, the UE can use physical carrier sensing to estimate an activity level of a channel and then correlate the activity level with information provided by an AP. The activity level can be correlated with information provided by an AP using the following equation: $W_R$=Abs (UE busy estimate−AP busy estimate)/maximum (UE busy estimate, AP busy estimate). In one embodiment, the UE busy estimate and the AP busy estimate can account for collisions during request to send (RTS) transmissions and clear to send (CTS) transmissions.

In another embodiment, for a throughput estimate in a 3GPP network, a worst case discrepancy or expected discrepancy in the throughput rates predicted by a UE specific channel quality indicator (CQI) multiple input multiple output (MIMO) mode preference network can be used to determine a reliability estimate. In one embodiment, the worst case discrepancy or expected discrepancy can be a predetermined value, such as a discrepancy value when a UE is in an idle mode. In one embodiment, the worst case discrepancy can be used for idle mode UEs where throughput estimate errors may initially be large and then successively refined down as the UE connects to the network and gets better information. In another embodiment, throughput rates selected by the network can be used to determine a reliability estimate for a throughput estimate in a 3GPP network.

In one embodiment, when a reliability weight associated with a selected RAT is known, the network selection mechanism can be modified using the following equation:

$$\alpha' = \frac{\alpha}{W_{R,i,k}}, \quad (3)$$

where R is the reliability weight associated with the selected RAT, $W_{R,i,k}$ is a reliability weight associated with the radio-link between the UE and the other node, and $\alpha'$ is an adjusted throughput threshold value. The remaining variables are the same as described for equations 1 and 2 in the preceding paragraphs.

The radio-link-selection hysteresis threshold is derived using:

$$W_{R,i,k}\text{Throughput}_{i,k}(t) > \alpha \times \text{Throughput}_{i,j}(t) k \neq j \quad (4)$$

In equation 4, the UE can switch from the radio link with the current node, e.g. k, to the radio link with another node, e.g. j, when the adjusted throughput estimate $W_{R,i,k}$Throughput$_{i,k}$(t) exceeds the previous throughput Throughput$_{i,j}$(t) multiplied by the throughput threshold value $\alpha$.

Equation 4 is equivalent to $$\text{Throughput}_{i,k}(t) > \frac{\alpha}{W_{R,i,k}} \times \text{Throughput}_{i,j}(t) \quad k \neq j, \quad (5)$$

wherein the throughput threshold value comparing Throughput$_{i,k}$(t) and Throughput$_{i,j}$(t) becomes $$\alpha' = \frac{\alpha}{W_{R,i,k}}.$$

The remaining variables are the same as described for equations 1 and 2 in the preceding paragraphs. In one embodiment, the hysteresis threshold can be a radio-link-selection hysteresis threshold of a radio link between a UE and a node in a multi-RAT HetNet.

In one embodiment, a hysteresis threshold can be adjusted for each RAT that the UE may be considering for network selection. In another embodiment, a function generating a reduced set of values for adjusting a hysteresis threshold across multiple RATs can be computed.

In one embodiment, the network can provide information for the adjustment of a RAT selection threshold. Each cell or RAT in the network can provide a UE with load information and a reliability factor. In one embodiment, a reliability factor can be computed by the network by aggregating reliability reports sent by the UE using standard signaling for reporting UE measurements. In one embodiment, WLAN AP specific reliability reports can be sent by the UE to a 3GPP node serving the UE. In one embodiment, the 3GPP cell can provide the information for adjusting the RAT selection threshold to the UE using broadcast signaling, such as using a system information block or dedicated signaling.

In one embodiment, the UE or the network can adjust a network selection probability, i.e. the probability of a UE selecting a network, for one or more networks that the UE uses to select a RAT or cell of a network. In one embodiment, the network selection probability can be adjusted dynamically based on an estimation of one or more collisions that occur when making network selection decisions. In another embodiment, the network selection probability can be adjusted downward or upward based on the reliability of the throughput estimates.

In another embodiment, one or more UEs can communicate reliability estimates of RATs or cells to the network and the network can use the reliability estimates to determine optimal network controlled RAT assignments. For example, a UE can report WLAN load information to a 3GPP network. Reliability estimates from the UE can be combined with the WLAN load information to make network based RAT assignment decisions.

In one embodiment, an adaptation mechanism for network selection can use adaption metrics for network selection, such as a received signal strength indication (RSSI), application quality, etc. In another embodiment, network selection can be based on a per quality of service class identifier (QCI) basis. The UEs can also report reliability information for one or more metrics of interest and report such information on a per QCI basis.

Figure 6:
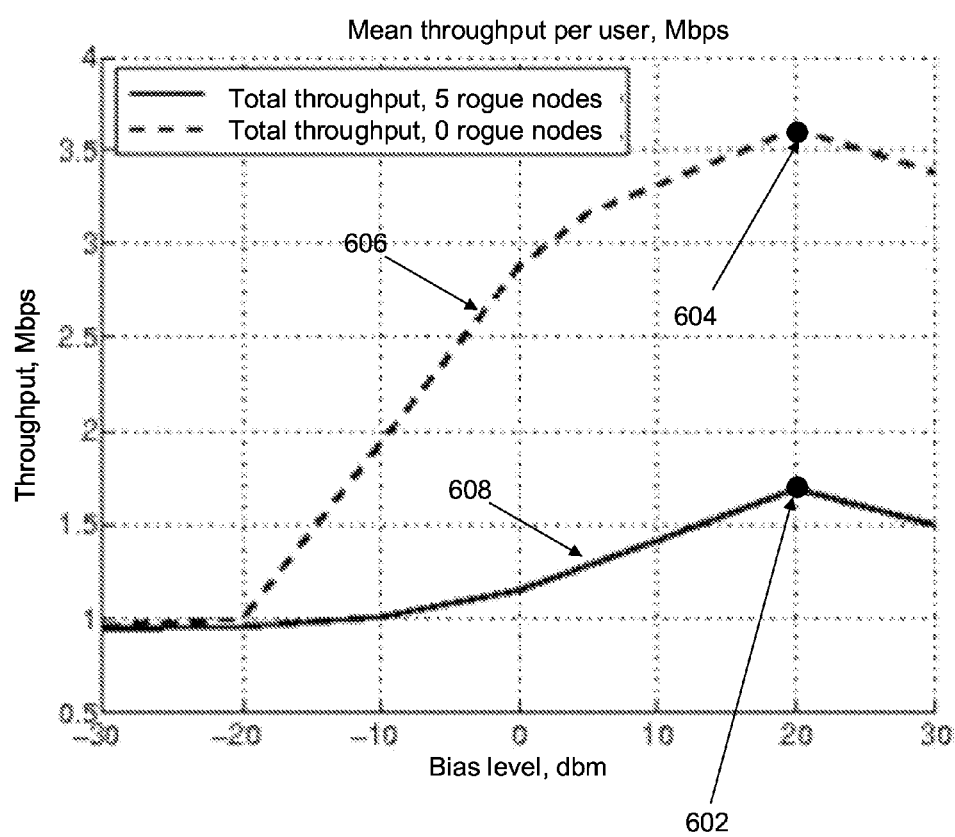
FIG. 6 depicts a UE-centric RSSI-based graph showing a graph of a mean user throughput versus hysteresis in accordance with an example.

FIG. 6 depicts an UE-centric RSSI-based scheme that relies on network-wide optimization of a bias factor. FIG. 6 further depicts a UE-centric RSSI-based graph 600 showing a graph of a mean user throughput versus hysteresis. Line 606 of the UE-centric RSSI-based graph 600 shows a performance of a WiFi network with five rogue nodes for each AP. Line 608 of the UE-centric RSSI-based graph 600 shows a performance of a WiFi network without any rogue nodes. Points 602 and 604 along lines 606 and 608, respectively, show that an optimal bias can be selected based on a greatest average user throughput performance.

In one embodiment, the RATs used may include a multiple different RATs, such as 3GPP RATs, WLAN RATs, mm-wave RATs, D2D RATs, 60 GHz RATs, etc. In another embodiment, the cellular network may be a 3GPP LTE Rel. 8, 9, 10, 11, or 12 or IEEE 802.16p, 802.16n, 802.16m-2011, 802.16h-2010, 802.16j-2009, 802.16-2009.

Figure 7:
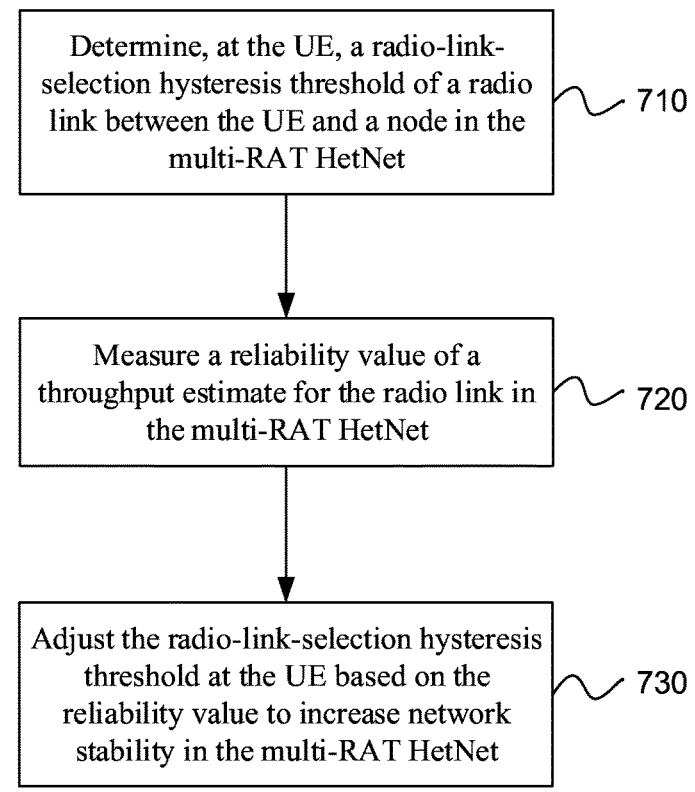
FIG. 7 depicts the functionality of the computer circuitry of a UE in a multi-RAT heterogeneous network HetNet in accordance with an example.

Another example provides functionality 700 of computer circuitry of a UE in a multi-RAT heterogeneous network (HetNet), as shown in the flow chart in FIG. 7. The functionality can be implemented as a method or the functionality can be executed as instructions on a machine, where the instructions are included on at least one computer readable medium or one non-transitory machine readable storage medium. The computer circuitry can be configured to determine, at the UE, a radio-link-selection hysteresis threshold of a radio link between the UE and a node in the multi-RAT HetNet, as in block 710. The computer circuitry can be further configured to measure a reliability value of a throughput estimate for the radio link in the multi-RAT HetNet, as in block 720. The computer circuitry can also be configured to adjust the radio-link-selection hysteresis threshold at the UE based on the reliability value to increase network stability in the multi-RAT HetNet, as in block 730.

In one embodiment, the computer circuitry can be configured to select a radio link in the multi-RAT HetNet based the throughput estimate and the radio-link-selection hysteresis threshold. In another embodiment, the selected radio link is a radio link between the UE and the node in the multi-RAT HetNet. In another embodiment, the selected radio link is a radio link between the UE and an other node in the multi-RAT HetNet. In one embodiment, the computer circuitry can be configured to measure an actual throughput of the UE on the radio link in the multi-RAT HetNet, receive load information of the radio link and estimate a throughput of the radio link in the multi-RAT HetNet, and correlate the actual throughput with the estimated throughput to determine the reliability value.

In another embodiment, the computer circuitry can be configured to correlate the actual throughput with the estimated throughput to determine the reliability value using $W_R$=Abs(Actual Throughput−Estimated Throughput)/maximum (Actual Throughput, Estimated Throughput), wherein $W_R$ wherein is the reliability value and Abs is an absolute value. In another embodiment, the computer circuitry can be configured to store previous reliability estimates for each throughput estimate for the radio link in the multi-RAT HetNet, compute a statistical measurement based on the stored previous reliability estimates, and determine the reliability value using the statistical measurement.

In another embodiment, computing the statistical measurement includes taking an average of the stored previous reliability estimates, taking a median of the stored previous reliability estimates, or taking a median plus variance of the stored previous reliability estimates. In another embodiment, the computer circuitry can be configured to determine, at the UE, a radio-link-selection hysteresis threshold for one or more radio links in a plurality of multi-RAT HetNets, measure a reliability value of a throughput estimate for the one or more radio links in a plurality of multi-RAT HetNets, and adjust the radio-link-selection hysteresis threshold at the UE for each of the one or more radio links based on the reliability value for each of the one or more radio links to increase network stability in the plurality of multi-RAT HetNets. In another embodiment, the computer circuitry can be configured to adjust the radio-link-selection hysteresis using $$\alpha' = \frac{\alpha}{W_{R,i,k}},$$

wherein $W_R$ is a reliability weight associated with the radio-link between the UE and the node, i is the UE, k is an other node in the multi-RAT HetNet, $W_{R,i,k}$ is a reliability weight associated with the radio-link between the UE and the other node, $\alpha$ is a default throughput threshold value, and $\alpha'$ is an adjusted throughput threshold value.

Figure 8:
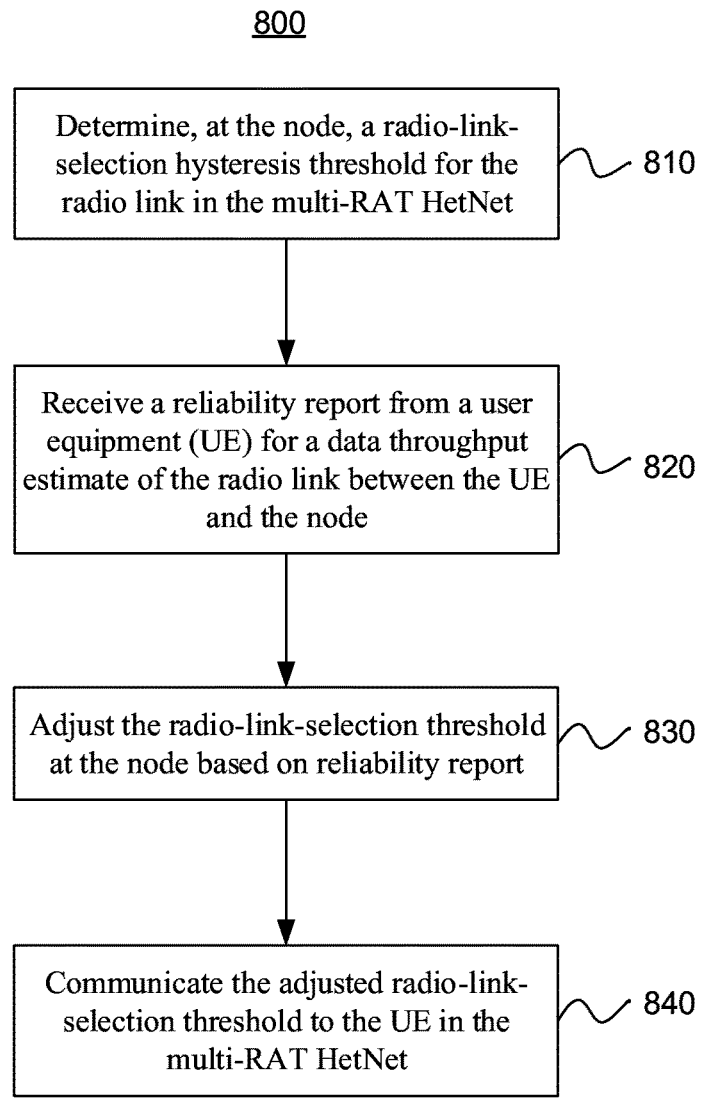
FIG. 8 depicts the functionality of the computer circuitry of an eNode B in a multi-RAT heterogeneous network HetNet in accordance with an example.

Another example provides functionality 800 of computer circuitry of an eNodeB in a multi-RAT heterogeneous network (HetNet), as shown in the flow chart in FIG. 8. The functionality can be implemented as a method or the functionality can be executed as instructions on a machine, where the instructions are included on at least one computer readable medium or one non-transitory machine readable storage medium. The computer circuitry can be configured to determine, at the node, a radio-link-selection hysteresis threshold for the radio link in the multi-RAT HetNet, as in block 810. The computer circuitry can be further configured to receive a reliability report from a user equipment (UE) for a data throughput estimate of the radio link between the UE and the node, as in block 820. The computer circuitry can also be configured to adjust the radio-link-selection threshold at the node based on reliability report, as in block 830. The computer circuitry can also be configured to communicate the adjusted radio-link-selection threshold to the UE in the multi-RAT HetNet, as in block 840.

In one embodiment, the computer circuitry can be configured to aggregate a plurality of reliability reports received from the UE for a plurality of nodes in one or more multi-RAT HetNet. In another embodiment, the computer circuitry can be configured to determine a reliability factor for the plurality of nodes in the one or more multi-RAT HetNets based on the aggregated reliability reports. In one embodiment, the computer circuitry can be configured to receive a reliability report at the node from an other node in the one or more multi-RAT HetNets via the UE. In another embodiment, the computer circuitry can be configured to communicate one or more reliability reports of one or more nodes to the UE using a system information block or a dedicated signal.

Figure 9:
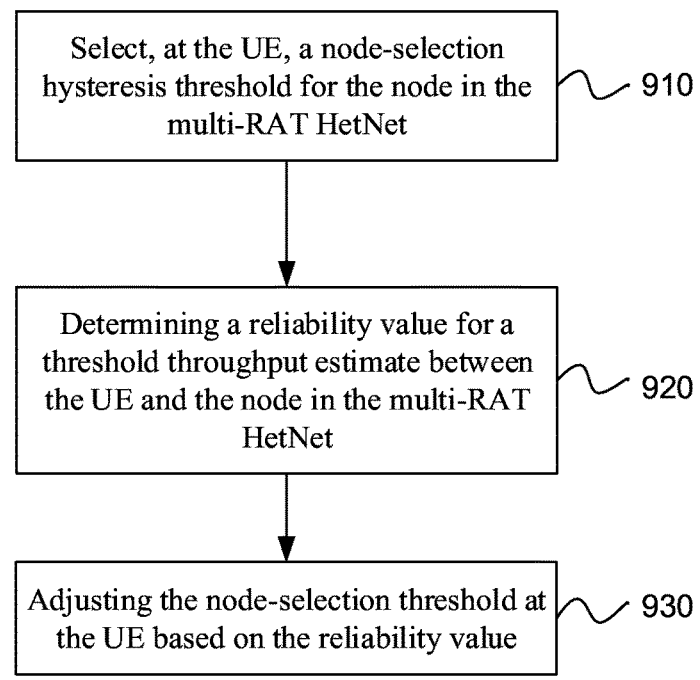
FIG. 9 illustrates a method for adjusting a node-selection threshold for a node in a multiple radio access technology multi-RAT HetNet in accordance with an example.

Another example provides a method 900 for adjusting a node-selection threshold for a node in a multiple radio access technology multi-RAT HetNet, as shown in the flow chart in FIG. 9. The method can comprise selecting, at the UE, a node-selection hysteresis threshold for the node in the multi-RAT HetNet, as in block 910. The method can further comprise determining a reliability value for a threshold throughput estimate between the UE and the node in the multi-RAT HetNet, as in block 920. The method can further comprise adjusting the node-selection threshold at the UE based on the reliability value, as in block 930.

In one embodiment, the method can further comprise estimating, at the UE, an activity level of a channel of the node using physical carrier sensing, receiving an activity level estimation from an access point (AP) in the multi-RAT HetNet, and correlating the activity level estimated by the UE with the received activity level estimation from the AP to determine the reliability value at the UE for threshold throughput estimate. In another embodiment, the method can further comprise correlating the activity level estimated by the UE with the received activity level estimation from the AP using $W_R$=Abs (UE activity level—AP activity level)/maximum (UE activity level, AP activity level), wherein $W_R$ wherein is the reliability value and Abs is an absolute value. In one embodiment, the activity level estimated by the UE or the received activity level estimation from the AP can account for collisions on a request to send (RTS) transmission or a clear to send (CTS) transmission.

In another embodiment, the method can further comprise estimating a worst case discrepancy or an expected discrepancy in throughput rates using a channel quality indicator (CQI) multiple input multiple output (MIMO) mode preference, determining potential throughput rates selected by the network, and determining a reliability value for threshold throughput estimate between the UE and the node in the multi-RAT HetNet based on the worst case discrepancy or expected discrepancy in throughput rates and the potential throughput rates selected by the network. In another embodiment, the worst case discrepancy or the expected discrepancy in throughput rates is determined based on an idle mode of the UE. In another embodiment, the method can further comprise: determining a threshold based on a reliability value of: received signal strength indication (RSSI) estimate of a radio link with a node in the multi-RAT HetNet; an application quality estimate of the radio link; or a per quality of service class identifier (QCI) basis. The method can also comprise adjusting the node-selection threshold at the UE based on the reliability value.

Figure 10:
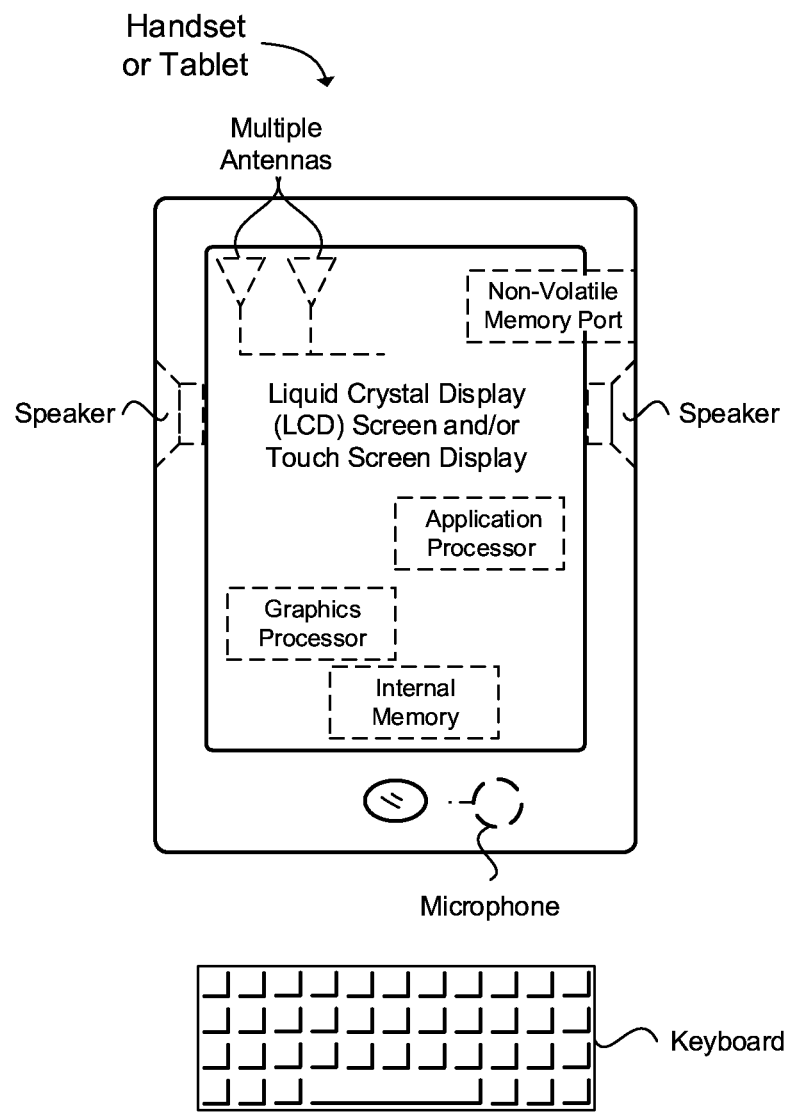
FIG. 10 illustrates a diagram of a user equipment (UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) in a multiple radio access technology (multi-RAT) heterogeneous network (HetNet), the UE having computer circuitry comprising:
   memory; and a processor coupled to the memory, configured to:
      determine, at the UE, a radio-link-selection hysteresis threshold of a radio link between the UE and a node in the multi-RAT HetNet;
      measure a reliability value of a throughput estimate for the radio link in the multi-RAT HetNet; and
      adjust the radio-link-selection hysteresis threshold at the UE based on the reliability value to increase network stability in the multi-RAT HetNet.

2. The computer circuitry of claim 1, further configured to select a radio link in the multi-RAT HetNet based the throughput estimate and the radio-link-selection hysteresis threshold.

3. The computer circuitry of claim 2, wherein the selected radio link is a radio link between the UE and the node in the multi-RAT HetNet.

4. The computer circuitry of claim 2, wherein the selected radio link is a radio link between the UE and an other node in the multi-RAT HetNet.

5. The computer circuitry of claim 1, further configured to:
   measure an actual throughput of the UE on the radio link in the multi-RAT HetNet;
   receive load information of the radio link and estimate a throughput of the radio link in the multi-RAT Hetnet; and
   correlate the actual throughput with the estimated throughput to determine the reliability value.

6. The computer circuitry of claim 2, further configured to correlate the actual throughput with the estimated throughput to determine the reliability value using $W_R$=Abs(Actual Throughput−Estimated Throughput)/maximum (Actual Throughput, Estimated Throughput), wherein $W_R$ wherein is the reliability value and Abs is an absolute value.

7. The computer circuitry of claim 1, further configured to:
   store previous reliability estimates for each throughput estimate for the radio link in the multi-RAT HetNet;
   compute a statistical measurement based on the stored previous reliability estimates; and
   determine the reliability value using the statistical measurement.

8. The computer circuitry of claim 7, wherein computing the statistical measurement includes taking an average of the stored previous reliability estimates, taking a median of the stored previous reliability estimates, or taking a median plus variance of the stored previous reliability estimates.

9. The computer circuitry of claim 1, further configured to:
   determine, at the UE, a radio-link-selection hysteresis threshold for one or more radio links in a plurality of multi-RAT HetNets;
   measure a reliability value of a throughput estimate for the one or more radio links in a plurality of multi-RAT HetNets; and
   adjust the radio-link-selection hysteresis threshold at the UE for each of the one or more radio links based on the reliability value for each of the one or more radio links to increase network stability in the plurality of multi-RAT HetNets.

10. The computer circuitry of claim 1, further configured to adjust the radio-link-selection hysteresis using $$\alpha' = \frac{\alpha}{W_{R,i,k}},$$

wherein $W_R$ is a reliability weight associated with the radio-link between the UE and the node, i is the UE, k is an other node in the multi-RAT HetNet, α is a default throughput threshold value, and α' is an adjusted throughput threshold value.

11. A node in a multiple radio access technology (multi-RAT) heterogeneous network (HetNet), the node having computer circuitry comprising:
memory; and a processor coupled to the memory, configured to:
determine, at the node, a radio-link-selection hysteresis threshold for the radio link in the multi-RAT HetNet;
receive a reliability report from a user equipment (UE) for a data throughput estimate of the radio link between the UE and the node;
adjust the radio-link-selection threshold at the node based on reliability report; and
communicate the adjusted radio-link-selection threshold to the UE in the multi-RAT HetNet.

12. The computer circuitry of claim 11, further configured to aggregate a plurality of reliability reports received from the UE for a plurality of nodes in one or more multi-RAT HetNet.

13. The computer circuitry of claim 12, further configured to determine a reliability factor for the plurality of nodes in the one or more multi-RAT HetNets based on the aggregated reliability reports.

14. The computer circuitry of claim 12, further configured to receive a reliability report at the node from an other node in the one or more multi-RAT HetNets via the UE.

15. The computer circuitry of claim 14, further configured to communicate one or more reliability reports of one or more nodes to the UE using a system information block or a dedicated signal.

16. The computer circuitry of claim 11, wherein the computer circuitry is further configured to operate on a third generation partnership project (3GPP) Rel. 8, 9, 10, 11 or 12 network or an Institute of Electronics and Electrical Engineers (IEEE) 802.11-2012, IEEE 802.11ac, or IEEE 802.11ad based network.

17. The computer circuitry of claim 11, wherein the computer circuitry is further configured make a RAT assignment decision for a UE based on the reliability report from the UE.

18. At least one non-transitory machine readable storage medium having instructions embodied thereon for adjusting a node-selection threshold for a node in a multiple radio access technology (multi-RAT) heterogeneous network (HetNet), the instructions that when executed by at least one processor perform the following:
select, at the UE, a node-selection hysteresis threshold for the node in the multi-RAT HetNet;
determining a reliability value for a threshold throughput estimate between the UE and the node in the multi-RAT HetNet; and
adjusting the node-selection threshold at the UE based on the reliability value.

19. The at least one non-transitory machine readable storage medium of claim 18, further comprising instructions that when executed by the at least one processor performs the following:
estimating, at the UE, an activity level of a channel of the node using physical carrier sensing;
receive an activity level estimation from an access point (AP) in the multi-RAT HetNet; and
correlating the activity level estimated by the UE with the received activity level estimation from the AP to determine the reliability value at the UE for threshold throughput estimate.

20. The at least one non-transitory machine readable storage medium of claim 19, further comprising instructions that when executed by the at least one processor performs the following:
correlating the activity level estimated by the UE with the received activity level estimation from the AP using $W_R$=Abs (UE activity level−AP activity level)/maximum (UE activity level, AP activity level), wherein $W_R$ wherein is the reliability value and Abs is an absolute value.

21. The at least one non-transitory machine readable storage medium of claim 19, wherein the activity level estimated by the UE or the received activity level estimation from the AP can account for collisions on a request to send (RTS) transmission or a clear to send (CTS) transmission.

22. The at least one non-transitory machine readable storage medium of claim 18, further comprising instructions that when executed by the at least one processor performs the following:
estimating a worst case discrepancy or an expected discrepancy in throughput rates using a channel quality indicator (CQI) multiple input multiple output (MIMO) mode preference;
determining potential throughput rates selected by the network; and
determining a reliability value for threshold throughput estimate between the UE and the node in the multi-RAT HetNet based on the worst case discrepancy or expected discrepancy in throughput rates and the potential throughput rates selected by the network.

23. The at least one non-transitory machine readable storage medium of claim 22, wherein the worst case discrepancy or the expected discrepancy in throughput rates is determined based on an idle mode of the UE.

24. The at least one non-transitory machine readable storage medium of claim 18, further comprising instructions that when executed by the at least one processor performs the following:
determining a threshold based on a reliability value of:
received signal strength indication (RSSI) estimate of a radio link with a node in the multi-RAT HetNet;
an application quality estimate of the radio link; or
a per quality of service class identifier (QCI) basis; and
adjusting the node-selection threshold at the UE based on the reliability value for use in RAT selection.

25. The at least one non-transitory machine readable storage medium of claim 18, further comprising instructions that when executed by the at least one processor performs the following:
restricting the UE from switching to another node in the multi-RAT HetNet based on a probability of a network condition occurring.

* * * * *